United States Patent
Hsia (10) Patent No.: US 10,645,782 B2
(45) Date of Patent: May 5, 2020

(54) SOLID-STATE LIGHTING WITH EMERGENCY POWER MANAGEMENT

(71) Applicant: Aleddra Inc., Renton, WA (US)

(72) Inventor: Chungho Hsia, Bellevue, WA (US)

(73) Assignee: ALEDDRA INC., Renton, WA (US)

( * ) Notice: Subject to any disclaimer, the term of this patent is extended or adjusted under 35 U.S.C. 154(b) by 0 days.

(21) Appl. No.: 16/572,040

(22) Filed: Sep. 16, 2019

(65) Prior Publication Data

US 2020/0015334 A1  Jan. 9, 2020

Related U.S. Application Data (63) Continuation-in-part of application No. 16/547,502, filed on Aug. 21, 2019, now Pat. No. 10,485,073, which is a continuation-in-part of application No. 16/530,747, filed on Aug. 2, 2019, now Pat. No. 10,492,265, which is a continuation-in-part of application No. 16/458,823, filed on Jul. 1, 2019, now Pat. No. 10,485,065, which is a continuation-in-part of application No. 16/432,735, filed on Jun. 5, 2019,
(Continued)

(51) Int. Cl.
| | |
|---|---|
| H05B 45/37 | (2020.01) |
| H02M 1/44 | (2007.01) |
| H02J 7/00 | (2006.01) |
| H02J 9/06 | (2006.01) |
| H02J 7/02 | (2016.01) |
| H02M 1/42 | (2007.01) |
| H02M 3/24 | (2006.01) |
| H02M 7/06 | (2006.01) |

(52) U.S. Cl.
CPC ............ *H05B 45/37* (2020.01); *H02J 7/0068* (2013.01); *H02J 7/022* (2013.01); *H02J 9/061* (2013.01); *H02M 1/44* (2013.01); *H02M 1/4208* (2013.01); *H02M 3/24* (2013.01); *H02M 7/06* (2013.01)

(58) Field of Classification Search
None
See application file for complete search history.

(56) References Cited

U.S. PATENT DOCUMENTS

| | | | |
|---|---|---|---|
| 9,247,623 B2* | 1/2016 | Recker | ............. H05B 47/20 |
| 10,038,326 B2* | 7/2018 | Chen | ............. H02J 7/007184 |

(Continued)

*Primary Examiner* — Minh D A
*Assistant Examiner* — James H Cho
(74) *Attorney, Agent, or Firm* — Han IP PLLC; Andy M. Han (57) ABSTRACT

A light-emitting diode (LED) luminaire comprises a rechargeable battery, LED array(s), at least two drivers, a battery charging circuit, and a luminaire control circuit. The LED luminaire may be used to replace a fluorescent or a conventional LED lamp connected to AC mains to operate in both a normal mode and an emergency mode. The at least two drivers comprise an LED driving circuit and a power supply unit respectively configured to drive the LED arrays when AC mains are unavailable and available. The luminaire control circuit comprises a first switch circuit and a second switch circuit respectively configured to manage discharging and charging of the rechargeable battery. The luminaire control circuit further comprises a switchover circuit configured to manage an LED driving current from either the LED driving circuit or the power supply unit to drive the LED arrays without crosstalk.

40 Claims, 3 Drawing Sheets

Related U.S. Application Data now Pat. No. 10,390,396, which is a continuation-in-part of application No. 16/401,849, filed on May 2, 2019, now Pat. No. 10,390,395, which is a continuation-in-part of application No. 16/296,864, filed on Mar. 8, 2019, now Pat. No. 10,390,394, which is a continuation-in-part of application No. 16/269,510, filed on Feb. 6, 2019, now Pat. No. 10,314,123, which is a continuation-in-part of application No. 16/247,456, filed on Jan. 14, 2019, now Pat. No. 10,327,298, which is a continuation-in-part of application No. 16/208,510, filed on Dec. 3, 2018, now Pat. No. 10,237,946, which is a continuation-in-part of application No. 16/154,707, filed on Oct. 8, 2018, now Pat. No. 10,225,905, which is a continuation-in-part of application No. 15/947,631, filed on Apr. 6, 2018, now Pat. No. 10,123,388, which is a continuation-in-part of application No. 15/911,086, filed on Mar. 3, 2018, now Pat. No. 10,136,483, which is a continuation-in-part of application No. 15/897,106, filed on Feb. 14, 2018, now Pat. No. 10,161,616, which is a continuation-in-part of application No. 15/874,752, filed on Jan. 18, 2018, now Pat. No. 10,036,515, which is a continuation-in-part of application No. 15/836,170, filed on Dec. 8, 2017, now Pat. No. 10,021,753, which is a continuation-in-part of application No. 15/649,392, filed on Jul. 13, 2017, now Pat. No. 9,986,619, which is a continuation-in-part of application No. 15/444,536, filed on Feb. 28, 2017, now Pat. No. 9,826,595, which is a continuation-in-part of application No. 15/362,772, filed on Nov. 28, 2016, now Pat. No. 9,967,927, which is a continuation-in-part of application No. 15/225,748, filed on Aug. 1, 2016, now Pat. No. 9,743,484, which is a continuation-in-part of application No. 14/818,041, filed on Aug. 4, 2015, now Pat. No. 9,420,663, which is a continuation-in-part of application No. 14/688,841, filed on Apr. 16, 2015, now Pat. No. 9,288,867, which is a continuation-in-part of application No. 14/465,174, filed on Aug. 21, 2014, now Pat. No. 9,277,603, which is a continuation-in-part of application No. 14/135,116, filed on Dec. 19, 2013, now Pat. No. 9,163,818, which is a continuation-in-part of application No. 13/525,249, filed on Jun. 15, 2012, now Pat. No. 8,749,167.

(56) References Cited

U.S. PATENT DOCUMENTS

| | | | |
|---|---|---|---|
| 2013/0147351 A1* | 6/2013 | Trainor | H02J 9/065 315/86 |
| 2015/0015076 A1* | 1/2015 | Park | H02J 9/061 307/66 |
| 2018/0062415 A1* | 3/2018 | Chen | H02J 7/0045 |

* cited by examiner

SOLID-STATE LIGHTING WITH EMERGENCY POWER MANAGEMENT

CROSS-REFERENCE TO RELATED APPLICATIONS

The present disclosure is part of a continuation-in-part (CIP) application of U.S. patent application Ser. No. 16/547,502, filed 21 Aug. 2019, which is part of CIP application of U.S. patent application Ser. No. 16/530,747, filed 2 Aug. 2019, which is part of CIP application of U.S. patent application Ser. No. 16/458,823, filed 1 Jul. 2019, which is part of CIP application of U.S. patent application Ser. No. 16/432,735, filed 5 Jun. 2019 and issued as U.S. Pat. No. 10,390,396 on 20 Aug. 2019, which is part of CIP application of U.S. patent application Ser. No. 16/401,849, filed 2 May 2019 and issued as U.S. Pat. No. 10,390,395 on 20 Aug. 2019, which is part of CIP application of U.S. patent application Ser. No. 16/296,864, filed 8 Mar. 2019 and issued as U.S. Pat. No. 10,390,394 on 20 Aug. 2019, which is part of CIP application of U.S. patent application Ser. No. 16/269,510, filed 6 Feb. 2019 and issued as U.S. Pat. No. 10,314,123 on 4 Jun. 2019, which is part of CIP application of U.S. patent application Ser. No. 16/247,456, filed 14 Jan. 2019 and issued as U.S. Pat. No. 10,327,298 on 18 Jun. 2019, which is part of CIP application of U.S. patent application Ser. No. 16/208,510, filed 3 Dec. 2018 and issued as U.S. Pat. No. 10,237,946 on 19 Mar. 2019, which is part of CIP application of U.S. patent application Ser. No. 16/154,707, filed 8 Oct. 2018 and issued as U.S. Pat. No. 10,225,905 on 5 Mar. 2019, which is part of a CIP application of U.S. patent application Ser. No. 15/947,631, filed 6 Apr. 2018 and issued as U.S. Pat. No. 10,123,388 on 6 Nov. 2018, which is part of a CIP application of U.S. patent application Ser. No. 15/911,086, filed 3 Mar. 2018 and issued as U.S. Pat. No. 10,136,483 on 20 Nov. 2018, which is part of a CIP application of U.S. patent application Ser. No. 15/897,106, filed 14 Feb. 2018 and issued as U.S. Pat. No. 10,161,616 on 25 Dec. 2018, which is a CIP application of U.S. patent application Ser. No. 15/874,752, filed 18 Jan. 2018 and issued as U.S. Pat. No. 10,036,515 on 31 Jul. 2018, which is a CIP application of U.S. patent application Ser. No. 15/836,170, filed 8 Dec. 2017 and issued as U.S. Pat. No. 10,021,753 on 10 Jul. 2018, which is a CIP application of U.S. patent application of Ser. No. 15/649,392 filed 13 Jul. 2017 and issued as U.S. Pat. No. 9,986,619 on 29 May 2018, which is a CIP application of U.S. patent application Ser. No. 15/444,536, filed 28 Feb. 2017 and issued as U.S. Pat. No. 9,826,595 on 21 Nov. 2017, which is a CIP application of U.S. patent application Ser. No. 15/362,772, filed 28 Nov. 2016 and issued as U.S. Pat. No. 9,967,927 on 8 May 2018, which is a CIP application of U.S. patent application Ser. No. 15/225,748, filed 1 Aug. 2016 and issued as U.S. Pat. No. 9,743,484 on 22 Aug. 2017, which is a CIP application of U.S. patent application Ser. No. 14/818,041, filed 4 Aug. 2015 and issued as U.S. Pat. No. 9,420,663 on 16 Aug. 2016, which is a CIP application of U.S. patent application Ser. No. 14/688,841, filed 16 Apr. 2015 and issued as U.S. Pat. No. 9,288,867 on 15 Mar. 2016, which is a CIP application of U.S. patent application Ser. No. 14/465,174, filed 21 Aug. 2014 and issued as U.S. Pat. No. 9,277,603 on 1 Mar. 2016, which is a CIP application of U.S. patent application Ser. No. 14/135,116, filed 19 Dec. 2013 and issued as U.S. Pat. No. 9,163,818 on 20 Oct. 2015, which is a CIP application of U.S. patent application Ser. No. 13/525,249, filed 15 Jun. 2012 and issued as U.S. Pat. No. 8,749,167 on 10 Jun. 2014. Contents of the above-identified applications are incorporated herein by reference in their entirety.

BACKGROUND

Technical Field

The present disclosure relates to light-emitting diode (LED) lighting systems and more particularly to an LED luminaire that includes a luminaire control circuit to manage either charging or discharging of the rechargeable battery and to manage LED driving current from two current sources to operate LED arrays.

Description of the Related Art

Solid-state lighting from semiconductor LEDs has received much attention in general lighting applications today. Because of its potential for more energy savings, better environmental protection (with no hazardous materials used), higher efficiency, smaller size, and longer lifetime than conventional incandescent bulbs and fluorescent tubes, the LED-based solid-state lighting will be a mainstream for general lighting in the near future. Meanwhile, as LED technologies develop with the drive for energy efficiency and clean technologies worldwide, more families and organizations will adopt LED lighting for their illumination applications. In this trend, the potential safety concerns such as risk of electric shock and fire become especially important and need to be well addressed.

In today's retrofit applications of an LED lamp to replace an existing fluorescent lamp, consumers may choose either to adopt a ballast-compatible LED lamp with an existing ballast used to operate the fluorescent lamp or to employ an AC mains-operable LED lamp by removing/bypassing the ballast. Either application has its advantages and disadvantages. In the former case, although the ballast consumes extra power, it is straightforward to replace the fluorescent lamp without rewiring, which consumers have a first impression that it is the best alternative. But the fact is that total cost of ownership for this approach is high regardless of very low initial cost. For example, the ballast-compatible LED lamps work only with particular types of ballasts. If the existing ballast is not compatible with the ballast-compatible LED lamp, the consumer will have to replace the ballast. Some facilities built long time ago incorporate different types of fixtures, which requires extensive labor for both identifying ballasts and replacing incompatible ones. Moreover, the ballast-compatible LED lamp can operate longer than the ballast. When an old ballast fails, a new ballast will be needed to replace in order to keep the ballast-compatible LED lamps working. Maintenance will be complicated, sometimes for the lamps and sometimes for the ballasts. The incurred cost will preponderate over the initial cost savings by changeover to the ballast-compatible LED lamps for hundreds of fixtures throughout a facility. In addition, replacing a failed ballast requires a certified electrician. The labor costs and long-term maintenance costs will be unacceptable to end users. From energy saving point of view, a ballast constantly draws power, even when the ballast-compatible LED lamps are dead or not installed. In this sense, any energy saved while using the ballast-compatible LED lamps becomes meaningless with the constant energy use by the ballast. In the long run, the ballast-compatible LED lamps are more expensive and less efficient than self-sustaining AC mains-operable LED lamps.

On the contrary, an AC mains-operable LED lamp does not require a ballast to operate. Before use of the AC mains-operable LED lamp, the ballast in a fixture must be removed or bypassed. Removing or bypassing the ballast does not require an electrician and can be replaced by end users. Each AC mains-operable LED lamp is self-sustaining. Once installed, the AC mains-operable LED lamps will only need to be replaced after 50,000 hours. In view of above advantages and disadvantages of both the ballast-compatible LED lamps and the AC mains-operable LED lamps, it seems that market needs a most cost-effective solution by using a universal LED lamp that can be used with the AC mains and is compatible with a ballast so that LED lamp users can save an initial cost by changeover to such an LED lamp followed by retrofitting the lamp fixture to be used with the AC mains when the ballast dies.

Furthermore, the AC mains-operable LED lamps can easily be used with emergency lighting, which is especially important in this consumerism era. The emergency lighting systems in retail sales and assembly areas with an occupancy load of 100 or more are required by codes in many cities. Occupational Safety and Health Administration (OSHA) requires that a building's exit paths be properly and automatically lighted at least ninety minutes of illumination at a minimum of 10.8 lux so that an employee with normal vision can see along the exit route after the building power becomes unavailable. This means that emergency egress lighting must operate reliably and effectively during low visibility evacuations. To ensure reliability and effectiveness of backup lighting, building owners should abide by the National Fire Protection Association's (NFPA) emergency egress light requirements that emphasize performance, operation, power source, and testing. OSHA requires most commercial buildings to adhere to the NFPA standards or a significant fine. Meeting OSHA requirements takes time and investment, but not meeting them could result in fines and even prosecution. If a building has egress lighting problems that constitute code violations, the quickest way to fix is to replace existing lamps with multi-function LED lamps that have an emergency light package integrated with the normal lighting. The code also requires the emergency lights be inspected and tested to ensure they are in proper working conditions at all times. It is, therefore, the manufacturers' responsibility to design an LED lamp, an LED luminaire, or an LED lighting system with a luminaire power pack integrated without operational uncertainties and hazards.

SUMMARY

An LED luminaire is used to replace a fluorescent or an LED lamp normally operated with the AC mains. The LED luminaire comprises at least two electrical conductors configured to couple to the AC mains, one or more LED arrays with a forward voltage thereon, a rechargeable battery, at least one full-wave rectifier, at least one input filter coupled to the at least one full-wave rectifier, a charging circuit, an LED driving circuit, a power supply unit, and a luminaire control circuit. The at least one full-wave rectifier is coupled to the at least two electrical conductors and configured to convert a line voltage from the AC mains into a first direct-current (DC) voltage. The at least one input filter is configured to suppress an electromagnetic interference (EMI) noise. The rechargeable battery comprises a high-potential electrode and a low-potential electrode with a terminal voltage thereon. The charging circuit comprises a control device, a first transformer, a first ground reference, and a second ground reference electrically coupled to the low-potential electrode. The charging circuit is coupled to the at least one full-wave rectifier via the at least one input filter and configured to convert the first DC voltage into a second DC voltage that charges the terminal voltage of the rechargeable battery to reach a third DC voltage.

The LED driving circuit comprises an input inductor, a logic control device, an electronic switch, at least one diode rectifier, an input capacitor, and an output capacitor connected between the at least one diode rectifier and the low-potential electrode. The LED driving circuit is configured to receive the third DC voltage from the rechargeable battery and to convert the third DC voltage into a fourth DC voltage with a first LED driving current to power up the one or more LED arrays when the line voltage from the AC mains is unavailable. The power supply unit comprises a main transformer and a third ground reference. The power supply unit is configured to generate a main DC voltage with a second LED driving current to power up the one or more LED arrays at full power and to meet LED luminaire efficacy requirements when the line voltage from the AC mains is available.

The luminaire control circuit comprises a first switch circuit and a second switch circuit partially coupled to the first switch circuit. The luminaire control circuit is configured to regulate charging and/or discharging of the rechargeable battery. The first switch circuit comprises a first electronic switch configured to couple the rechargeable battery to the LED driving circuit and is configured to manage discharging of the rechargeable battery. The second switch circuit comprises a second electronic switch configured to couple the charging circuit to the rechargeable battery and is configured to manage charging of the rechargeable battery.

Each of the first electronic switch and the second electronic switch comprises either a metal-oxide-semiconductor field-effect transistor (MOSFET) or a bipolar junction transistor (BJT). The MOSFET comprises a P-Channel MOSFET. The first switch circuit further comprises a third electronic switch and a first set of one or more resistors. The third electronic switch and the first set of the one or more resistors are configured to detect whether the second DC voltage exists and to bias and turn on the first electronic switch based on a result of detection. The third electronic switch comprises either an MOSFET or a BJT. The MOSFET comprises an N-Channel MOSFET. The first switch circuit further comprises a first controllable voltage supply coupled to the third electronic switch. The first controllable voltage supply is configured to bias the third electronic switch, thereby promoting to turn on the first electronic switch. The second switch circuit further comprises a fourth electronic switch and a second set of one or more resistors. The fourth electronic switch and the second set of the one or more resistors are configured to bias and to turn on the second electronic switch. The fourth electronic switch comprises either an MOSFET or a BJT. The MOSFET comprises an N-Channel MOSFET. The second switch circuit further comprises a second controllable voltage supply coupled to the fourth electronic switch. The second controllable voltage supply is configured to bias the fourth electronic switch, thereby promoting to turn on the second electronic switch.

The luminaire control circuit further comprises a switchover circuit configured to regulate either the first LED driving current or the second LED driving current to drive the one or more LED arrays. The switchover circuit comprises a first voltage reference coupled to the second ground reference and a second voltage reference coupled to the third ground reference, each of the first voltage reference and the second voltage reference configured to set up a respective current return path for either the first LED driving current or the second LED driving current to drive the one or more LED arrays. The switchover circuit comprises a fifth electronic switch and a third set of one or more resistors. The fifth electronic switch and the third set of the one or more resistors are configured to detect the first LED driving current and to set up a first current path thereof to drive the one or more LED arrays. The fifth electronic switch comprises either an MOSFET or a BJT. The MOSFET comprises an N-Channel MOSFET. The switchover circuit further comprises a sixth electronic switch and a fourth set of one or more resistors, the sixth electronic switch and the fourth set of the one or more resistors configured to detect the second LED driving current and to set up a second current path thereof to drive the one or more LED arrays. The sixth electronic switch comprises either an MOSFET or a BJT. The MOSFET comprises an N-Channel MOSFET. The LED driving circuit further comprises a first current blocking diode configured to allow the first LED driving current to flow into the one or more LED arrays but to prevent the second LED driving current from flowing into the LED driving circuit, avoiding crosstalk. The LED driving circuit further comprises a third controllable voltage supply coupled to the logic control device. The third controllable voltage supply is configured to either enable or disable the LED driving circuit. The power supply unit further comprises a second current blocking diode configured to allow the second LED driving current to flow into the one or more LED arrays but to prevent the first LED driving current from flowing into the power supply unit, avoiding crosstalk. The power supply unit further comprises a pulse width modulation (PWM) control circuit and a pair of input ports configured to receive a 0-to-10 V (volts) signal, a 1-to-10 V (volts) signal, or a PWM signal. The power supply unit may be disabled when a rechargeable battery test is performed.

BRIEF DESCRIPTION OF THE DRAWINGS

Non-limiting and non-exhaustive embodiments of the present disclosure are described with reference to the following figures, wherein like reference numerals refer to like parts throughout the various figures unless otherwise specified. Moreover, in the section of detailed description of the invention, any of a "main", a "primary", a "secondary", a "first", a "second", a "third", and so forth does not necessarily represent a part that is mentioned in an ordinal manner but represents a particular one.

DETAILED DESCRIPTION OF THE INVENTION

Figure 1:
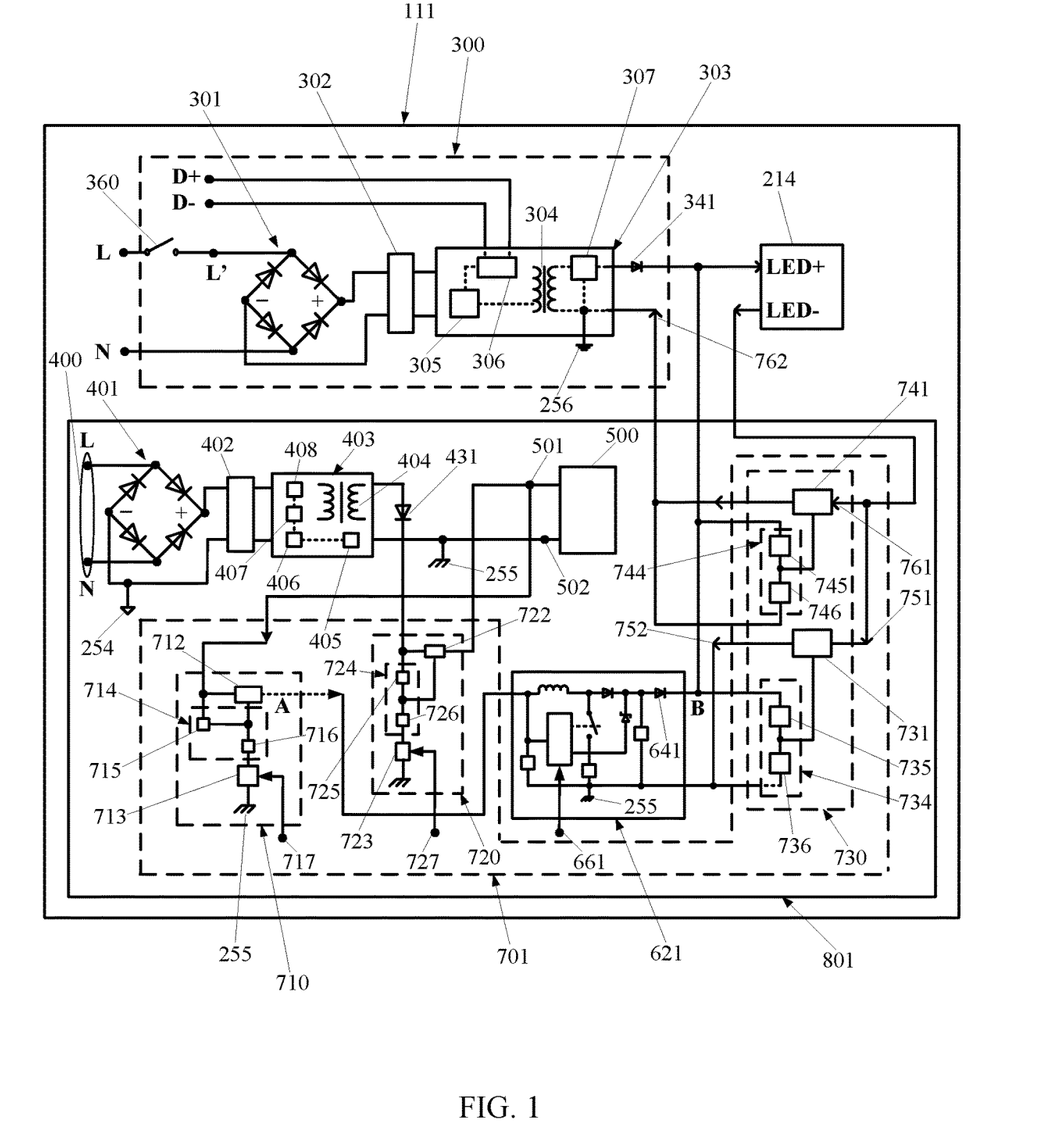
FIG. 1 is a block diagram of an LED luminaire according to the present disclosure.

FIG. 1 is a block diagram of an LED luminaire according to the present disclosure. The LED luminaire 111 is used to replace a fluorescent or an LED lamp normally operated with the AC mains in a normal mode. In FIG. 1, the LED luminaire 111 comprises one or more LED arrays 214 with a forward voltage thereon, a power supply unit 300, and an LED luminaire power pack 801. The LED luminaire power pack 801 comprises an LED driving circuit 621 configured to provide an emergency power (a voltage and a current) to drive the one or more LED arrays 214 when the line voltage from the AC mains is unavailable. The power supply unit 300 originally designed to receive the line voltage from the AC mains for general lighting applications is configured to operate in the normal mode. The power supply unit 300 comprises at least two electrical conductors "L" and "N", a main full-wave rectifier 301, and an input filter 302. The at least two electrical conductors "L" and "N" are configured to couple to "L" and "N" 400 in the LED luminaire power pack 801 via a power switch 360. The main full-wave rectifier 301 is configured to convert the line voltage from the AC mains into a primary DC voltage. In other words, the at least two electrical conductors "L" and "N" are coupled to a switched power, in which the power supply unit 300 can be turned off. The input filter 302 is configured to suppress electromagnetic interference (EMI) noises. The power supply unit 300 further comprises a power switching converter 303 comprising a main transformer 304 and a power factor correction (PFC) and power switching circuit 305. The PFC and power switching circuit 305 is coupled to the main full-wave rectifier 301 via the input filter 302 and configured to improve a power factor and to convert the primary DC voltage into a main DC voltage. The main DC voltage is configured to couple to the one or more LED arrays 214 to operate thereon. The main transformer 304 comprises a third ground reference 256, electrically isolated from a negative (−) port of the main full-wave rectifier 301. The one or more LED arrays 214 comprises a first terminal LED+ and a second terminal LED− configured to receive an LED driving current from the first terminal LED+ and to return from the second terminal LED− to either the LED driving circuit 621 or the power supply unit 300, depending on which one is an LED driving source. The power switching converter 303 further comprises a pulse width modulation (PWM) control circuit 306 and a pair of input ports denoted as "D+D−" configured to receive a 0-to-10 V signal, a 1-to-10 V signal, a PWM signal, or a signal from a variable resistor for luminaire dimming applications. The pair of the input ports "D+D−" may be used to disable the power switching converter 303 when a rechargeable battery test is performed. The power switching converter 303 is a current source, providing a second LED driving current to the one or more LED arrays 214 via a switchover circuit 730 to operate thereon.

In FIG. 1, the LED luminaire power pack 801 further comprises the at least two electrical conductors "L" and "N" 400 configured to couple to the AC mains, a rechargeable battery 500, at least one full-wave rectifier 401, at least one input filter 402 coupled to the at least one full-wave rectifier 401, a charging circuit 403, and a luminaire control circuit 701. The at least one full-wave rectifier 401 is coupled to the at least two electrical conductors "L" and "N" 400 and configured to convert the line voltage from the AC mains into a first DC voltage. The at least one input filter 402 is configured to suppress EMI noises. The rechargeable battery 500 comprises a high-potential electrode 501 and a low-potential electrode 502 with a terminal voltage thereon. The charging circuit 403 is an isolated step-down converter and comprises a first ground reference 254, a second ground reference 255 electrically isolated from the first ground reference 254, a first transformer 404, a feedback control circuit 405, a control device 406, a first electronic switch 407, and a diode 408. The charging circuit 403 is coupled to the full-wave rectifier 401 via the input filter 402 and configured to convert the first DC voltage into a second DC voltage that charges the terminal voltage of the rechargeable battery 500 to reach a third DC voltage. The feedback control circuit 405 is configured to monitor the second DC voltage and to regulate the control device 406 according to charging voltage and current requirements. The first transformer 404 comprises a primary winding coupled to the first ground reference 254 and a secondary winding coupled to the second ground reference 255. The first transformer 404 is configured to provide electrical isolation between the AC mains and the second DC voltage with respect to the second ground reference 255. In FIG. 1, the second ground reference 255 is electrically coupled to the low-potential electrode 502 to ease a charging current to flow into the rechargeable battery 500 and to return to the charging circuit 403, completing a power transfer.

Figure 2:
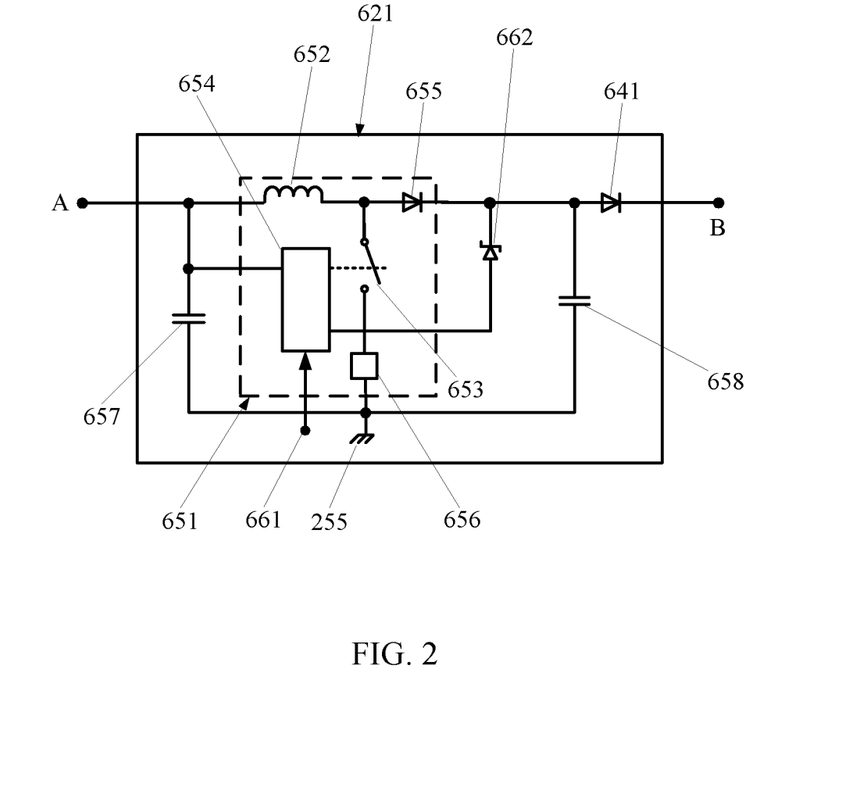
FIG. 2 is a block diagram of an LED driving circuit according to the present disclosure.

FIG. 2 is a block diagram of the LED driving circuit according to the present disclosure. Referring to FIG. 1 and FIG. 2, the LED driving circuit 621 comprises a step-up converter 651 comprising an input inductor 652, an electronic switch 653, a logic control device 654, at least one diode rectifier 655, and a sensing resistor 656. The LED driving circuit 621 further comprises an input capacitor 657, an output capacitor 658 coupled between the at least one diode rectifier 655 and the second ground reference 255, and a Zener diode 662, in which the input capacitor 657 and the output capacitor 658 are configured to filter out unwanted voltage noises generated from the step-up converter 651. The LED driving circuit 621 is configured to boost the third DC voltage with a first LED driving current into a fourth DC voltage appearing at port "B" with respect to the second ground reference 255. The logic control device 654 is configured to control the electronic switch 653 "on" and "off". The electronic switch 653 comprises either a metal-oxide-semiconductor field-effect transistor (MOSFET) or a bipolar junction transistor (BJT). The LED driving circuit 621 is configured to couple to the third DC voltage via the port denoted as "A" from the luminaire control circuit 701 and further from the rechargeable battery 500 via a discharging process when the line voltage from the AC mains is unavailable. The fourth DC voltage is greater than the forward voltage to make sure operating the external one or more LED arrays 214 without failure when the line voltage from the AC mains is unavailable. In FIG. 1 and FIG. 2, the output capacitor is connected between the at least one diode rectifier 655 and the second ground reference 255, which is further connected to the low-potential electrode 502 to ease a discharging current from the rechargeable battery 500 to flow into the LED driving circuit 621 and to return to the rechargeable battery 500, completing a power transfer. In other words, the LED driving circuit 621 is configured to receive the third DC voltage from the rechargeable battery 500 and to convert the third DC voltage into the fourth DC voltage with the first LED driving current to power up the one or more LED arrays 214 when the line voltage from the AC mains is unavailable. The power supply unit 300 is configured to generate the main DC voltage with the second LED driving current to power up the one or more LED arrays 214 at full power and to meet LED luminaire efficacy requirements when the line voltage from the AC mains is available.

In FIG. 1, the luminaire control circuit 701 comprises a first switch circuit 710 and a second switch circuit 720 partially coupled to the first switch circuit 710. The luminaire control circuit 701 is configured to regulate charging and/or discharging of the rechargeable battery 500. The first switch circuit 710 comprises a first electronic switch 712 configured to couple the rechargeable battery 500 to the LED driving circuit 621 and is configured to manage discharging of the rechargeable battery 500. The second switch circuit 720 comprises a second electronic switch 722 configured to couple the charging circuit 403 to the rechargeable battery 500 and is configured to manage charging of the rechargeable battery 500.

Each of the first electronic switch 710 and the second electronic switch 720 comprises either an MOSFET or a BJT. The MOSFET comprises a P-Channel MOSFET. The first switch circuit 710 further comprises a third electronic switch 713 and a first set of one or more resistors 714. The first set of the one or more resistors 714 may comprise a resistor 715 and another resistor 716. The third electronic switch 713 and the first set of the one or more resistors 714 are configured to detect whether the second DC voltage exists and to bias and turn on the first electronic switch 712 based on a result of detection. The third electronic switch 713 comprises either an MOSFET or a BJT. The MOSFET comprises an N-Channel MOSFET. The first switch circuit 710 further comprises a first controllable voltage supply 717 coupled to the third electronic switch 713. The first controllable voltage supply 717 is configured to bias the third electronic switch 713, thereby promoting to turn on the first electronic switch 712, allowing a discharging current from the rechargeable battery 500 to flow into the LED driving circuit 621 to enable thereon. The second switch circuit 720 further comprises a fourth electronic switch 723 and a second set of one or more resistors 724. The fourth electronic switch 723 and the second set of the one or more resistors 724 are configured to bias and to turn on the second electronic switch 722. The second set of the one or more resistors 724 may comprise a resistor 725 and another resistor 726. The fourth electronic switch 723 comprises either an MOSFET or a BJT. The MOSFET comprises an N-Channel MOSFET. The second switch circuit 720 further comprises a second controllable voltage supply 727 coupled to the fourth electronic switch 723. The second controllable voltage supply 727 is configured to bias the fourth electronic switch 723, thereby promoting to turn on the second electronic switch 722, allowing a charging current from the charging circuit 403 to flow into the rechargeable battery 500 to store energy thereon.

The luminaire control circuit 701 further comprises the switchover circuit 730 configured to regulate either the first LED driving current or the second LED driving current to drive the one or more LED arrays 214. The switchover circuit 730 comprises a fifth electronic switch 731 and a third set of one or more resistors 734. The third set of the one or more resistors 734 may comprise a resistor 735 and another resistor 736. The fifth electronic switch 731 and the third set of the one or more resistors 734 are configured to detect the first LED driving current and to set up a first current path thereof to drive the one or more LED arrays 214. The fifth electronic switch 731 comprises either an MOSFET or a BJT. The MOSFET comprises an N-Channel MOSFET. The switchover circuit 730 further comprises a sixth electronic switch 741 and a fourth set of one or more resistors 744. The fourth set of the one or more resistors 744 may comprise a resistor 745 and another resistor 746. The sixth electronic switch 741 and the fourth set of the one or more resistors 744 are configured to detect the second LED driving current and to set up a second current path thereof to drive the one or more LED arrays 214. The sixth electronic switch 741 comprises either an MOSFET or a BJT. The MOSFET comprises an N-Channel MOSFET. The switchover circuit 730 comprises a first voltage reference coupled to the second ground reference 255 and a second voltage reference coupled to the third ground reference 256, each of the first voltage reference and the second voltage reference configured to set up a respective current return path for either the first LED driving current or the second LED driving current to drive the one or more LED arrays 214. For example, the first LED driving current can flow via the port "B", the first terminal LED+, the one or more LED arrays 214, the second terminal LED−, a first current path 751, the fifth electronic switch 731, and a second current path 752 to return to the second ground reference 255, thereby powering up the one or more LED arrays 214. Similarly, the second LED driving current can flow via a second current blocking diode 341, the first terminal LED+, the one or more LED arrays 214, the second terminal LED−, a third current path 761, the sixth electronic switch 741, and a fourth current path 762 to return to the third ground reference 256, thereby powering up the one or more LED arrays 214. The LED driving circuit 621 further comprises a first current blocking diode 641 configured to allow the first LED driving current to flow into the one or more LED arrays 214 but to prevent the second LED driving current from flowing into the LED driving circuit 621, avoiding crosstalk. The LED driving circuit 621 further comprises a third controllable voltage supply 661 coupled to the logic control device 654 (FIG. 2). The third controllable voltage supply 661 is configured to either enable or disable the LED driving circuit 621. On the other hand, the power supply unit 300 further comprises the second current blocking diode 341 configured to allow the second LED driving current to flow into the one or more LED arrays 214 but to prevent the first LED driving current from flowing into the power supply unit 300, avoiding crosstalk. The power supply unit 300 further comprises a pulse width modulation (PWM) control circuit and a pair of input ports D+D− configured to receive a 0-to-10 V (volts) signal, a 1-to-10 V (volts) signal, or a PWM signal. The power supply unit 300 is disabled when a rechargeable battery test is performed.

Figure 3:
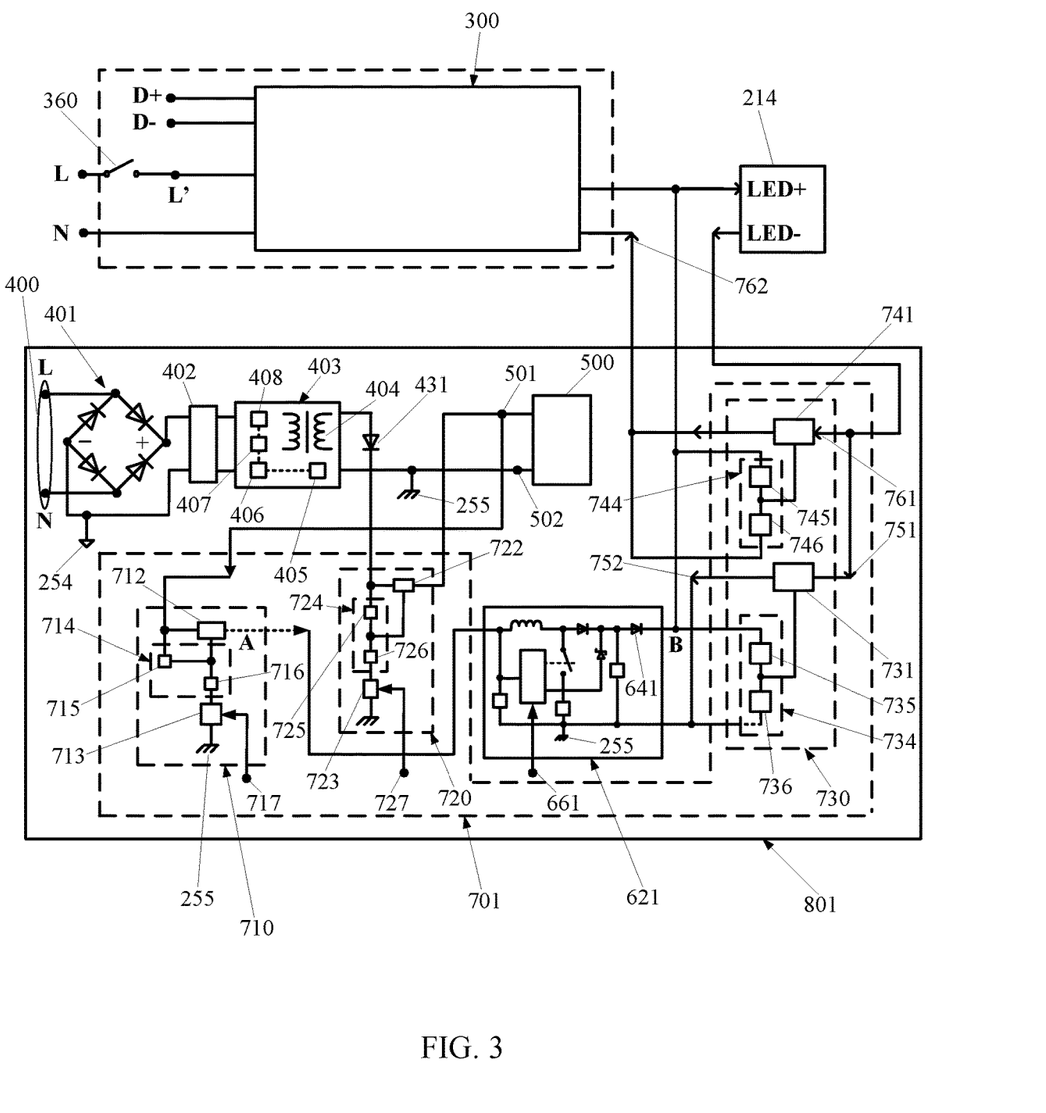
FIG. 3 is a block diagram of a luminaire power pack according to the present disclosure.

FIG. 3 is a block diagram of a luminaire power pack according to the present disclosure. The LED luminaire power pack 801 comprises an LED driving circuit 621 configured to provide an emergency power (i.e., a voltage and a current) to drive external one or more LED arrays 214 when the line voltage from the AC mains is unavailable. An external power supply unit 300 originally designed to receive the line voltage from the AC mains for general lighting applications is configured to operate in the normal mode. The external power supply unit 300 comprises at least two electrical conductors "L" and "N". The at least two electrical conductors "U" and "N" are configured to couple to "L" and "N" 400 in the LED luminaire power pack 801 via a power switch 360. The external one or more LED arrays 214 comprises a forward voltage thereon.

In FIG. 3, the LED luminaire power pack 801 further comprises the at least two electrical conductors "L" and "N" 400 configured to couple to the AC mains, a rechargeable battery 500, at least one full-wave rectifier 401, at least one input filter 402 coupled to the at least one full-wave rectifier 401, a charging circuit 403, and a luminaire control circuit 701. The at least one full-wave rectifier 401 is coupled to the at least two electrical conductors "L" and "N" 400 and configured to convert the line voltage from the AC mains into a first DC voltage. The at least one input filter 402 is configured to suppress EMI noises. The rechargeable battery 500 comprises a high-potential electrode 501 and a low-potential electrode 502 with a terminal voltage thereon. The charging circuit 403 is an isolated step-down converter and comprises a first ground reference 254, a second ground reference 255 electrically isolated from the first ground reference 254, a first transformer 404, a feedback control circuit 405, a control device 406, a first electronic switch 407, and a diode 408. The charging circuit 403 is coupled to the full-wave rectifier 401 via the input filter 402 and configured to convert the first DC voltage into a second DC voltage that charges the terminal voltage of the rechargeable battery 500 to reach a third DC voltage. The feedback control circuit 405 is configured to monitor the second DC voltage and to regulate the control device 406 according to charging voltage and current requirements. The first transformer 404 comprises a primary winding coupled to the first ground reference 254 and a secondary winding coupled to the second ground reference 255. The first transformer 404 is configured to provide electrical isolation between the AC mains and the second DC voltage with respect to the second ground reference 255. In FIG. 3, the second ground reference 255 is electrically coupled to the low-potential electrode 502 to ease a charging current to flow into the rechargeable battery 500 and to return to the charging circuit 403, completing a power transfer.

Referring to FIG. 2 and FIG. 3, the LED driving circuit 621 comprises a step-up converter 651 comprising an input inductor 652, an electronic switch 653, a logic control device 654, at least one diode rectifier 655, and a sensing resistor 656. The LED driving circuit 621 further comprises an input capacitor 657, an output capacitor 658 coupled between the at least one diode rectifier 655 and the second ground reference 255, and a Zener diode 662, in which the input capacitor 657 and the output capacitor 658 are configured to filter out unwanted voltage noises generated from the step-up converter 651. The LED driving circuit 621 is configured to boost the third DC voltage with a first LED driving current into a fourth DC voltage appearing at port "B" with respect to the second ground reference 255. The logic control device 654 is configured to control the electronic switch 653 "on" and "off". The electronic switch 653 comprises either a metal-oxide-semiconductor field-effect transistor (MOSFET) or a bipolar junction transistor (BJT). The LED driving circuit 621 is configured to couple to the third DC voltage via the port denoted as "A" from the luminaire control circuit 701 and further from the rechargeable battery 500 via a discharging process when the line voltage from the AC mains is unavailable. The fourth DC voltage is greater than the forward voltage of the external one or more LED arrays 214 to make sure operating the external one or more LED arrays 214 without failure when the line voltage from the AC mains is unavailable. In FIG. 2 and FIG. 3, the output capacitor is connected between the at least one diode rectifier 655 and the second ground reference 255, which is further connected to the low-potential electrode 502 to ease a discharging current from the rechargeable battery 500 to flow into the LED driving circuit 621 and to return to the rechargeable battery 500, completing a power transfer. In other words, the LED driving circuit 621 is configured to receive the third DC voltage from the rechargeable battery 500 and to convert the third DC voltage into the fourth DC voltage with the first LED driving current to power up the one or more LED arrays 214 when the line voltage from the AC mains is unavailable. The external power supply unit 300 is configured to generate the main DC voltage with the second LED driving current to power up the one or more LED arrays 214 at full power and to meet LED luminaire efficacy requirements when the line voltage from the AC mains is available.

In FIG. 3, the luminaire control circuit 701 comprises a first switch circuit 710 and a second switch circuit 720 partially coupled to the first switch circuit 710. The luminaire control circuit 701 is configured to regulate charging and/or discharging of the rechargeable battery 500. The first switch circuit 710 comprises a first electronic switch 712 configured to couple the rechargeable battery 500 to the LED driving circuit 621 and is configured to manage discharging of the rechargeable battery 500. The second switch circuit 720 comprises a second electronic switch 722 configured to couple the charging circuit 403 to the rechargeable battery 500 and is configured to manage charging of the rechargeable battery 500.

Each of the first electronic switch 710 and the second electronic switch 720 comprises either an MOSFET or a BJT. The MOSFET comprises a P-Channel MOSFET. The first switch circuit 710 further comprises a third electronic switch 713 and a first set of one or more resistors 714. The first set of the one or more resistors 714 may comprise a resistor 715 and another resistor 716. The third electronic switch 713 and the first set of the one or more resistors 714 are configured to detect whether the second DC voltage exists and to bias and turn on the first electronic switch 712 based on a result of detection. The third electronic switch 713 comprises either an MOSFET or a BJT. The MOSFET comprises an N-Channel MOSFET. The first switch circuit 710 further comprises a first controllable voltage supply 717 coupled to the third electronic switch 713. The first controllable voltage supply 717 is configured to bias the third electronic switch 713, thereby promoting to turn on the first electronic switch 712, allowing a discharging current from the rechargeable battery 500 to flow into the LED driving circuit 621 to enable thereon. The second switch circuit 720 further comprises a fourth electronic switch 723 and a second set of one or more resistors 724. The fourth electronic switch 723 and the second set of the one or more resistors 724 are configured to bias and to turn on the second electronic switch 722. The second set of the one or more resistors 724 may comprise a resistor 725 and another resistor 726. The fourth electronic switch 723 comprises either an MOSFET or a BJT. The MOSFET comprises an N-Channel MOSFET. The second switch circuit 720 further comprises a second controllable voltage supply 727 coupled to the fourth electronic switch 723. The second controllable voltage supply 727 is configured to bias the fourth electronic switch 723, thereby promoting to turn on the second electronic switch 722, allowing a charging current from the charging circuit 403 to flow into the rechargeable battery 500 to store energy thereon.

The luminaire control circuit 701 further comprises the switchover circuit 730 configured to regulate either the first LED driving current or the second LED driving current to drive the external one or more LED arrays 214. The switchover circuit 730 comprises a fifth electronic switch 731 and a third set of one or more resistors 734. The third set of the one or more resistors 734 may comprise a resistor 735 and another resistor 736. The fifth electronic switch 731 and the third set of the one or more resistors 734 are configured to detect the first LED driving current and to set up a first current path thereof to drive the external one or more LED arrays 214. The fifth electronic switch 731 comprises either an MOSFET or a BJT. The MOSFET comprises an N-Channel MOSFET. The switchover circuit 730 further comprises a sixth electronic switch 741 and a fourth set of one or more resistors 744. The fourth set of the one or more resistors 744 may comprise a resistor 745 and another resistor 746. The sixth electronic switch 741 and the fourth set of the one or more resistors 744 are configured to detect the second LED driving current and to set up a second current path thereof to drive the external one or more LED arrays 214. The sixth electronic switch 741 comprises either an MOSFET or a BJT. The MOSFET comprises an N-Channel MOSFET. The switchover circuit 730 comprises a first voltage reference coupled to the second ground reference 255 and a second voltage reference coupled to the third ground reference 256, each of the first voltage reference and the second voltage reference configured to set up a respective current return path for either the first LED driving current or the second LED driving current to drive the external one or more LED arrays 214. For example, the first LED driving current can flow via the port "B", the first terminal LED+, the external one or more LED arrays 214, the second terminal LED−, a first current path 751, the fifth electronic switch 731, and a second current path 752 to return to the second ground reference 255, thereby powering up the external one or more LED arrays 214. Similarly, the second LED driving current can flow via the external power supply unit 300, the first terminal LED+, the one or more LED arrays 214, the second terminal LED−, a third current path 761, the sixth electronic switch 741, and a fourth current path 762 to return to the third ground reference 256, thereby powering up the external one or more LED arrays 214. The LED driving circuit 621 further comprises a first current blocking diode 641 configured to allow the first LED driving current to flow into the one or more LED arrays 214 but to prevent the second LED driving current from flowing into the LED driving circuit 621, avoiding crosstalk. The LED driving circuit 621 further comprises a third controllable voltage supply 661 coupled to the logic control device 654 (FIG. 2). The third controllable voltage supply 661 is configured to either enable or disable the LED driving circuit 621. On the other hand, the external power supply unit 300 may further comprise a second current blocking diode 341 (not shown in FIG. 3) configured to allow the second LED driving current to flow into the external one or more LED arrays 214 but to prevent the first LED driving current from flowing into the external power supply unit 300, avoiding crosstalk. The external power supply unit 300 may further comprise a pulse width modulation (PWM) control circuit (not shown in FIG. 3) and a pair of input ports D+D− configured to receive a 0-to-10 V (volts) signal, a 1-to-10 V (volts) signal, or a PWM signal. The external power supply unit 300 may be disabled when a rechargeable battery test is performed.

Whereas preferred embodiments of the present disclosure have been shown and described, it will be realized that alterations, modifications, and improvements may be made thereto without departing from the scope of the following claims. Another kind of schemes with a luminaire power pack adopted in an LED luminaire to operate the LED luminaire using various kinds of combinations to accomplish the same or different objectives could be easily adapted for use from the present disclosure. Accordingly, the foregoing descriptions and attached drawings are by way of example only and are not intended to be limiting.

What is claimed is:
1. A light-emitting diode (LED) luminaire, comprising:
at least two electrical conductors configured to couple to alternate-current (AC) mains;
one or more LED arrays with a forward voltage thereon;
a rechargeable battery comprising a high-potential electrode and a low-potential electrode with a terminal voltage thereon;
at least one full-wave rectifier coupled to the at least two electrical conductors and configured to convert a line voltage from the AC mains into a first direct-current (DC) voltage;

at least one input filter coupled to the at least one full-wave rectifier, the at least one input filter configured to suppress an electromagnetic interference (EMI) noise;

a charging circuit comprising a control device, a first transformer, a first ground reference, and a second ground reference electrically coupled to the low-potential electrode, the charging circuit coupled to the at least one full-wave rectifier via the at least one input filter and configured to convert the first DC voltage into a second DC voltage that charges the terminal voltage of the rechargeable battery to reach a third DC voltage;

an LED driving circuit comprising an input inductor, a logic control device, an electronic switch, at least one diode rectifier, an input capacitor, and an output capacitor connected between the at least one diode rectifier and the low-potential electrode, the LED driving circuit configured to receive the third DC voltage from the rechargeable battery and to convert the third DC voltage into a fourth DC voltage with a first LED driving current to power up the one or more LED arrays when the line voltage from the AC mains is unavailable;

a power supply unit comprising a main transformer and a third ground reference, the power supply unit configured to generate a main DC voltage with a second LED driving current to power up the one or more LED arrays at full power and to meet LED luminaire efficacy requirements when the line voltage from the AC mains is available; and a luminaire control circuit comprising a first switch circuit and a second switch circuit partially coupled to the first switch circuit, the luminaire control circuit configured to regulate either or both of charging and discharging of the rechargeable battery, wherein:
the first switch circuit comprises a first electronic switch configured to couple the rechargeable battery to the LED driving circuit and is configured to manage discharging of the rechargeable battery;
the second switch circuit comprises a second electronic switch configured to couple the charging circuit to the rechargeable battery and is configured to manage charging of the rechargeable battery.

2. The LED luminaire of claim 1, wherein each of the first electronic switch and the second electronic switch comprises either a metal-oxide-semiconductor field-effect transistor (MOSFET) or a bipolar junction transistor (BJT).

3. The LED luminaire of claim 2, wherein the MOSFET comprises a P-Channel MOSFET.

4. The LED luminaire of claim 1, wherein the first switch circuit further comprises a third electronic switch and a first set of one or more resistors, the third electronic switch and the first set of the one or more resistors configured to detect whether the second DC voltage exists and to bias and turn on the first electronic switch based on a result of detection.

5. The LED luminaire of claim 4, wherein the third electronic switch comprises either a metal-oxide-semiconductor field-effect transistor (MOSFET) or a bipolar junction transistor (BJT).

6. The LED luminaire of claim 5, wherein the MOSFET comprises an N-Channel MOSFET.

7. The LED luminaire of claim 4, wherein the first switch circuit further comprises a first controllable voltage supply coupled to the third electronic switch, the first controllable voltage supply configured to bias the third electronic switch, thereby promoting to turn on the first electronic switch.

8. The LED luminaire of claim 1, wherein the second switch circuit further comprises a fourth electronic switch and a second set of one or more resistors, the fourth electronic switch and the second set of the one or more resistors configured to bias and to turn on the second electronic switch.

9. The LED luminaire of claim 8, wherein the fourth electronic switch comprises either a metal-oxide-semiconductor field-effect transistor (MOSFET) or a bipolar junction transistor (BJT).

10. The LED luminaire of claim 9, wherein the MOSFET comprises an N-Channel MOSFET.

11. The LED luminaire of claim 8, wherein the second switch circuit further comprises a second controllable voltage supply coupled to the fourth electronic switch, the second controllable voltage supply configured to bias the fourth electronic switch, thereby promoting to turn on the second electronic switch.

12. The LED luminaire of claim 1, wherein the luminaire control circuit further comprises a switchover circuit configured to regulate either the first LED driving current or the second LED driving current to drive the one or more LED arrays.

13. The LED luminaire of claim 12, wherein the switchover circuit comprises a first voltage reference coupled to the second ground reference and a second voltage reference coupled to the third ground reference, each of the first voltage reference and the second voltage reference configured to set up a respective current return path for either the first LED driving current or the second LED driving current to drive the one or more LED arrays.

14. The LED luminaire of claim 12, wherein the switchover circuit comprises a fifth electronic switch and a third set of one or more resistors, the fifth electronic switch and the third set of the one or more resistors configured to detect the first LED driving current and to set up a first current path thereof to drive the one or more LED arrays.

15. The LED luminaire of claim 14, wherein the fifth electronic switch comprises either a metal-oxide-semiconductor field-effect transistor (MOSFET) or a bipolar junction transistor (BJT).

16. The LED luminaire of claim 15, wherein the MOSFET comprises an N-Channel MOSFET.

17. The LED luminaire of claim 14, wherein the switchover circuit further comprises a sixth electronic switch and a fourth set of one or more resistors, the sixth electronic switch and the fourth set of the one or more resistors configured to detect the second LED driving current and to set up a second current path thereof to drive the one or more LED arrays.

18. The LED luminaire of claim 17, wherein the sixth electronic switch comprises either a metal-oxide-semiconductor field-effect transistor (MOSFET) or a bipolar junction transistor (BJT).

19. The LED luminaire of claim 18, wherein the MOSFET comprises an N-Channel MOSFET.

20. The LED luminaire of claim 1, wherein the LED driving circuit further comprises a third controllable voltage supply coupled to the logic control device, the third controllable voltage supply configured to either enable or disable the LED driving circuit.

21. A light-emitting diode (LED) luminaire power pack, comprising:
at least two electrical conductors configured to couple to alternate-current (AC) mains;

a rechargeable battery comprising a high-potential electrode and a low-potential electrode with a terminal voltage thereon;

at least one full-wave rectifier coupled to the at least two electrical conductors and configured to convert a line voltage from the AC mains into a first direct-current (DC) voltage;

at least one input filter coupled to the at least one full-wave rectifier, the at least one input filter configured to suppress an electromagnetic interference (EMI) noise;

a charging circuit comprising a control device, a first transformer, a first ground reference, and a second ground reference electrically coupled to the low-potential electrode, the charging circuit coupled to the at least one full-wave rectifier via the at least one input filter and configured to convert the first DC voltage into a second DC voltage that charges the terminal voltage of the rechargeable battery to reach a third DC voltage;

an LED driving circuit comprising an input inductor, a logic control device, an electronic switch, at least one diode rectifier, an input capacitor, and an output capacitor connected between the at least one diode rectifier and the low-potential electrode, the LED driving circuit configured to receive the third DC voltage from the rechargeable battery and to convert the third DC voltage into a fourth DC voltage with a first LED driving current to power up external one or more LED arrays when the line voltage from the AC mains is unavailable; and a luminaire control circuit comprising a first switch circuit and a second switch circuit partially coupled to the first switch circuit, the luminaire control circuit configured to regulate either or both of charging and discharging of the rechargeable battery, wherein:
the first switch circuit comprises a first electronic switch configured to couple the rechargeable battery to the LED driving circuit and is configured to manage discharging of the rechargeable battery;
the second switch circuit comprises a second electronic switch configured to couple the charging circuit to the rechargeable battery and is configured to manage charging of the rechargeable battery.

22. The LED luminaire power pack of claim 21, wherein each of the first electronic switch and the second electronic switch comprises either a metal-oxide-semiconductor field-effect transistor (MOSFET) or a bipolar junction transistor (BJT).

23. The LED luminaire power pack of claim 22, wherein the MOSFET comprises a P-Channel MOSFET.

24. The LED luminaire power pack of claim 21, wherein the first switch circuit further comprises a third electronic switch and a first set of one or more resistors, the third electronic switch and the first set of the one or more resistors configured to detect whether the second DC voltage exists and to bias and turn on the first electronic switch based on a result of detection.

25. The LED luminaire power pack of claim 24, wherein the third electronic switch comprises either a metal-oxide-semiconductor field-effect transistor (MOSFET) or a bipolar junction transistor (BJT).

26. The LED luminaire power pack of claim 25, wherein the MOSFET comprises an N-Channel MOSFET.

27. The LED luminaire power pack of claim 24, wherein the first switch circuit further comprises a first controllable voltage supply coupled to the third electronic switch, the first controllable voltage supply configured to bias the third electronic switch, thereby promoting to turn on the first electronic switch.

28. The LED luminaire power pack of claim 21, wherein the second switch circuit further comprises a fourth electronic switch and a second set of one or more resistors, the fourth electronic switch and the second set of the one or more resistors configured to bias and to turn on the second electronic switch.

29. The LED luminaire power pack of claim 28, wherein the fourth electronic switch comprises either a metal-oxide-semiconductor field-effect transistor (MOSFET) or a bipolar junction transistor (BJT).

30. The LED luminaire power pack of claim 29, wherein the MOSFET comprises an N-Channel MOSFET.

31. The LED luminaire power pack of claim 28, wherein the second switch circuit further comprises a second controllable voltage supply coupled to the fourth electronic switch, the second controllable voltage supply configured to bias the fourth electronic switch, thereby promoting to turn on the second electronic switch.

32. The LED luminaire power pack of claim 31, wherein the luminaire control circuit further comprises a switchover circuit configured to regulate either the first LED driving current or a second LED driving current generated from an external power supply unit to drive the external one or more LED arrays.

33. The LED luminaire power pack of claim 32, wherein the switchover circuit comprises a first voltage reference coupled to the second ground reference and a second voltage reference coupled to the third ground reference, each of the first voltage reference and the second voltage reference configured to set up a respective current return path for either the first LED driving current or the second LED driving current to drive the external one or more LED arrays.

34. The LED luminaire power pack of claim 32, wherein the switchover circuit comprises a fifth electronic switch and a third set of one or more resistors, the fifth electronic switch and the third set of the one or more resistors configured to detect the first LED driving current and to set up a first current path thereof to drive the external one or more LED arrays.

35. The LED luminaire power pack of claim 34, wherein the fifth electronic switch comprises either a metal-oxide-semiconductor field-effect transistor (MOSFET) or a bipolar junction transistor (BJT).

36. The LED luminaire power pack of claim 35, wherein the MOSFET comprises an N-Channel MOSFET.

37. The LED luminaire power pack of claim 34, wherein the switchover circuit further comprises a sixth electronic switch and a fourth set of one or more resistors, the sixth electronic switch and the fourth set of the one or more resistors configured to detect the second LED driving current and to set up a second current path thereof to drive the external one or more LED arrays.

38. The LED luminaire power pack of claim 37, wherein the sixth electronic switch comprises either a metal-oxide-semiconductor field-effect transistor (MOSFET) or a bipolar junction transistor (BJT).

39. The LED luminaire power pack of claim 38, wherein the MOSFET comprises an N-Channel MOSFET.

40. The LED luminaire power pack of claim 21, wherein the LED driving circuit further comprises a third controllable voltage supply coupled to the logic control device, the third controllable voltage supply configured to either enable or disable the LED driving circuit.

* * * * *